United States Patent
Ji et al.

(10) Patent No.: US 11,652,752 B2
(45) Date of Patent: *May 16, 2023

(54) CONGESTION CONTROL METHOD AND NETWORK DEVICE

(71) Applicant: Huawei Technologies Co., Ltd., Shenzhen (CN)

(72) Inventors: Zhigang Ji, Beijing (CN); Di Qu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/645,411

(22) Filed: Dec. 21, 2021

(65) Prior Publication Data

US 2022/0116331 A1  Apr. 14, 2022

Related U.S. Application Data

(63) Continuation of application No. 17/018,566, filed on Sep. 11, 2020, now Pat. No. 11,233,746, which is a (Continued)

(30) Foreign Application Priority Data

Mar. 14, 2018  (CN) .......................... 201810208950.1

(51) Int. Cl.
  *H04L 47/10*  (2022.01)
  *H04L 47/12*  (2022.01)
  (Continued)

(52) U.S. Cl.
  CPC .............. *H04L 47/29* (2013.01); *H04L 47/12* (2013.01); *H04L 47/31* (2013.01); *H04L 47/50* (2013.01); *H04L 47/6255* (2013.01)

(58) Field of Classification Search
  None
  See application file for complete search history.

(56) References Cited

U.S. PATENT DOCUMENTS

| 7,000,025 | B1 | 2/2006 | Wilson | |
| 8,004,976 | B2 * | 8/2011 | Janarthanan | ............ H04L 47/10 370/235 |

(Continued)

FOREIGN PATENT DOCUMENTS

| CN | 1910867 A | 2/2007 |
| CN | 1910868 A | 2/2007 |

(Continued)

OTHER PUBLICATIONS

Han, H., "Improvemed Adaptive Transmission Control Protocol in Wireless Network", Computer Engineering, Apr. 2013, 4 pages, vol. 39, No. 4.

*Primary Examiner* — Anh Ngoc M Nguyen
(74) *Attorney, Agent, or Firm* — Slater Matsil, LLP

(57) ABSTRACT

A network device adds a fixed value to a congestion threshold (CT) when a first period ends. Detects whether a difference obtained by subtracting average traffic load of a queue in the first period from average traffic load of the queue in a second period is greater than a target increase value, sets the CT based on a detection result when the second period ends, where the first period is previous to the second period; marks a received packet when a quantity of packets buffered in the queue is greater than the CT, enqueues the marked packet and sends the marked packet to a receiving device.

20 Claims, 10 Drawing Sheets

Related U.S. Application Data continuation of application No. PCT/CN2019/077599, filed on Mar. 11, 2019.

(51) Int. Cl.
 *H04L 47/31* (2022.01)
 *H04L 47/50* (2022.01)
 *H04L 47/625* (2022.01)

(56) References Cited

U.S. PATENT DOCUMENTS

| | | | |
|---|---|---|---|
| 11,233,746 B2* | 1/2022 | Ji | ............ H04L 47/29 |
| 2013/0155855 A1 | 6/2013 | Kross et al. | |
| 2013/0159567 A1* | 6/2013 | Gallagher | ............. G06F 1/3234 |
| | | | 710/52 |
| 2016/0261512 A1* | 9/2016 | Lautenschlaeger | ... H04L 47/283 |
| 2017/0019343 A1 | 1/2017 | De Schepper et al. | |

FOREIGN PATENT DOCUMENTS

| | | |
|---|---|---|
| CN | 103220229 A | 7/2013 |
| CN | 106789701 A | 5/2017 |
| CN | 107592271 A | 1/2018 |

* cited by examiner

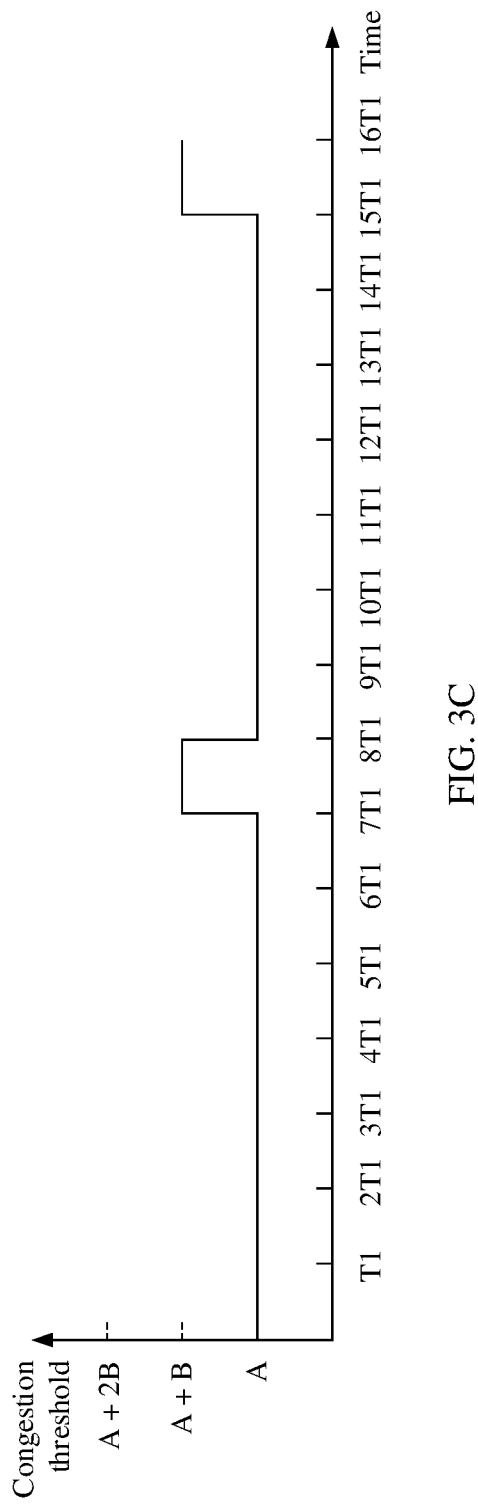

CONGESTION CONTROL METHOD AND NETWORK DEVICE

CROSS-REFERENCE TO RELATED APPLICATIONS

This application is a continuation of U.S. patent application Ser. No. 17/018,566, filed on Sep. 11, 2020, which is a continuation of International Application No. PCT/CN2019/077599, filed on Mar. 11, 2019, which claims priority to Chinese Patent Application No. 201810208950.1, filed on Mar. 14, 2018. The disclosures of the aforementioned application are hereby incorporated by reference in their entireties.

TECHNICAL FIELD

This application relates to the field of communications technologies, and in particular, to a congestion control method and a network device.

BACKGROUND

Explicit congestion notification (ECN) is a congestion control technology in which a user manually configures a congestion threshold for a queue on a network device. When a quantity of packets buffered in the queue is greater than the congestion threshold, the network device can mark a packet dequeued from the queue, and send the marked packet to a receiving device. When receiving the marked packet, the receiving device can notify a sending device to reduce a packet sending rate, to alleviate congestion of the network device. Currently, in the existing network device, the ECN is implemented with a static and fixed method in which the user needs to manually configure a fixed congestion threshold. However, as a service traffic pattern dynamically changes, the fixed congestion threshold cannot satisfy diversified requirements. A comparatively high congestion threshold and a comparatively large quantity of packets buffered in the queue require a comparatively high buffer capability of the network device, and indicate a comparatively long round-trip time (RTT) latency of a packet. A comparatively low congestion threshold indicates a comparatively low throughput of the queue, and comparatively low bandwidth usage. In view of this, how to configure an appropriate congestion threshold to meet the diversified requirements of the service traffic pattern is a current technical problem to be urgently resolved.

SUMMARY

To resolve the technical problem, embodiments of this application provide a congestion control method and a network device in which a congestion threshold of a queue can be automatically set based on traffic load of the queue, to improve a throughput of the queue and congestion control efficiency when there are a comparatively small quantity of packets buffered in the queue.

According to a first aspect, an embodiment of this application provides a congestion control method. A network device may add a fixed value to a congestion threshold after a first period ends, detects whether a difference obtained by subtracting average traffic load of a queue in the first period from average traffic load of the queue in the network device in a second period is greater than a target increase value, and set the congestion threshold based on a detection result after the second period ends. The first period is a period previous to the second period. The network device marks a received packet when a quantity of packets buffered in the queue is greater than the congestion threshold, and enqueues the marked packet in the queue. The mark indicates that congestion occurs on the network device. The network device may send, to a receiving device, the marked packet that is dequeued from the queue.

In this technical solution, after increasing the congestion threshold, the network device may detect whether a difference obtained by subtracting average traffic load of the queue before the congestion threshold is increased from average traffic load of the queue after the congestion threshold is increased is greater than the target increase value. Then, the congestion threshold is set based on the detection result. In this way, the congestion threshold of the queue can be automatically set based on traffic load of the queue, to improve a throughput of the queue and congestion control efficiency when there are a comparatively small quantity of packets buffered in the queue.

In a feasible embodiment, that the network device sets the congestion threshold based on a detection result may be specifically that: when the detection result is yes, the network device keeps a congestion threshold obtained after the fixed value is added unchanged. When average traffic load increase exceeds the target value, the added threshold is a more appropriate threshold than a threshold before the adding.

In a feasible embodiment, that the network device sets the congestion threshold based on a detection result may be specifically that: when the detection result is no and the difference is not less than a target decrease value, the network device subtracts the fixed value from the congestion threshold obtained after the fixed value is added. When the average traffic load increase does not exceed the target value, a threshold does not need to be increased. The threshold before the adding is the more appropriate threshold.

In a feasible embodiment, that the network device sets the congestion threshold based on a detection result may be specifically that: when the detection result is no and the difference is less than the target decrease value, the network device multiplies the congestion threshold obtained after the fixed value is added by a ratio of the average traffic load of the queue in the second period to the average traffic load of the queue in the first period. When service load suddenly decreases, the threshold is directly adjusted in proportion, to quickly adjust to an appropriate level.

In a feasible embodiment, when detecting that a difference obtained by subtracting average traffic load of the queue in a previous period of a third period from average traffic load of the queue in the third period is less than the target decrease value, and after the third period ends, the network device may multiply the congestion threshold by a ratio of the average traffic load of the queue in the third period to the average traffic load of the queue in the previous period of the third period. When the service load suddenly decreases, the threshold is directly adjusted in the proportion, to quickly adjust to the appropriate level.

In a feasible embodiment, that the network device sets the congestion threshold based on a detection result may be specifically that: when the detection result is yes, the network device re-adds the fixed value to a congestion threshold obtained after the fixed value is added. In a start phase, the congestion threshold is quickly added, to adjust to the appropriate level.

In a feasible embodiment, a manner in which the network device sets the congestion threshold based on the detection result may further be: the network device calculates a comparison threshold based on average traffic load of the queue in a fourth period, where the second period includes the fourth period, and sets the congestion threshold based on a smaller value between the comparison threshold and a congestion threshold obtained after the fixed value is added. The congestion threshold is set based on the comparison threshold. The fourth period is a subdivided period included in the second period, and can better reflect real-time control. When the average traffic load suddenly increases, the threshold is increased to avoid an under-throughput. When the average traffic load decreases, the threshold is decreased, to notify a source end to reduce a rate as soon as possible, to avoid excessive queue stacking.

In a feasible embodiment, that the network device calculates a comparison threshold may be specifically: the network device multiplies the average traffic load of the queue in the fourth period by a predetermined value, to obtain the comparison threshold. The preset value is set based on an actual situation, to flexibly control a queue buffer size and bandwidth usage.

According to a second aspect, an embodiment of this application provides a computer storage medium. The computer storage medium stores a computer program instruction. When the computer program instruction is executed by a network device, the network device is enabled to perform the method according to the first aspect.

According to a third aspect, an embodiment of this application provides an apparatus. The apparatus has a function of implementing an action of the network device in the method example in the first aspect. The function may be implemented by hardware, or may be implemented by hardware by executing corresponding software. The hardware or the software includes one or more units or modules corresponding to the foregoing function.

In a design solution, a structure of the apparatus may include a processing module and a sending module. The processing module is configured to support the network device in performing a corresponding function in the method in the first aspect, for example, setting a congestion threshold, performing a detection operation, and performing a calculation operation. The sending module is configured to support communication between the network device and another device (for example, a receiving device). The apparatus may further include a storage module and a receiving module. The storage module is configured to be coupled to the processing module. The storage module stores a program instruction and data that are necessary for the apparatus. The receiving module is configured to support communication between the network device and another device (for example, a sending device). In an example, the processing module may be a processor, the sending module may be a transmitter, the receiving module may be a receiver, and the storage module may be a memory.

According to a fourth aspect, an embodiment of this application provides a computer program product including an instruction. When the computer program product runs on a computer, the computer is enabled to perform the method according to the first aspect.

According to a fifth aspect, an embodiment of this application provides a network device. The network device includes a processor and a network interface. The processor is configured for the network device to implement functions in the first aspect, for example, generate or process data and/or information in the foregoing method, for example, setting a congestion threshold, performing a detection operation, and performing a calculation operation. The network interface is configured to support communication between the network device and another device (for example, a receiving device).

In a design solution, the network device further includes a memory. The memory is configured to store a computer program instruction and data that are necessary for the network device.

BRIEF DESCRIPTION OF THE DRAWINGS

To describe the technical solutions in embodiments of this application more clearly, the following describes the accompanying drawings in the embodiments of this application or the background.

FIG. 3C is a schematic diagram of a congestion threshold according to another embodiment of this application;

DETAILED DESCRIPTION OF ILLUSTRATIVE EMBODIMENTS

The following describes embodiments of this application with reference to accompanying drawings in the embodiments of this application.

Figure 1:
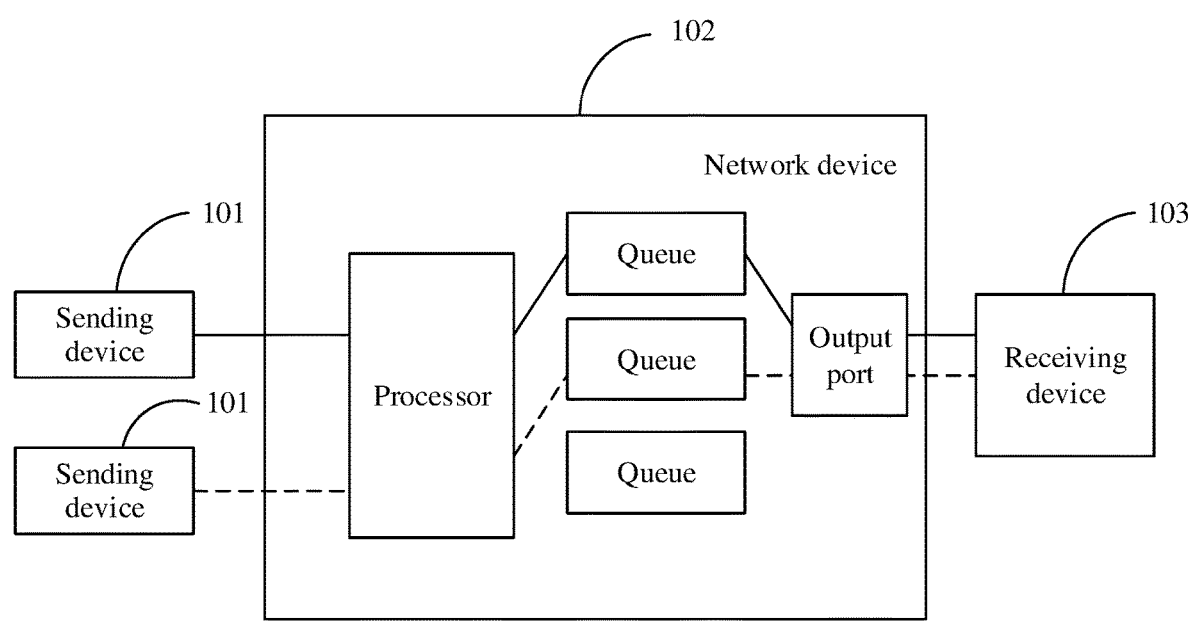
FIG. 1 is a schematic architectural diagram of a congestion control system according to an embodiment of this application.

To better understand a congestion control method and a network device disclosed in the embodiments of this application, the following first describes a network architecture to which the embodiments of this application are applicable. Refer to FIG. 1. FIG. 1 is a schematic architectural diagram of a congestion control system according to an embodiment of this application. As shown in FIG. 1, the congestion control system may include at least a sending device 101, at least one network device 102, and a receiving device 103. The sending device 101 sends a packet to the receiving device 103 by using the at least one network device 102. For example, the sending device 101 sends the packet to the network device 102. The network device 102 adds a fixed value to a congestion threshold after a first period ends. The network device 102 detects whether a difference obtained by subtracting average traffic load of a queue in the first period from average traffic load of the queue in a second period is greater than a target increase value. After the second period ends, the network device 102 sets the congestion threshold based on a detection result. When a quantity of packets buffered in the queue is greater than the congestion threshold, the network device 102 marks a received packet, enqueues the marked packet in the queue, and sends, to the receiving device 103, the marked packet that is dequeued from the queue. The receiving device 103 notifies, based on the marked packet, the sending device 101 to reduce a packet sending rate. In response to the notification, the sending device 101 reduces the packet sending rate for sending the packet to the network device 102, to reduce network congestion.

For example, that the network device 102 marks the packet may be setting a 2-bit ECN field in a packet header to 11, to indicate that the congestion occurs. In the example, the receiving device 103 may notify the sending device 101 to reduce the packet sending rate by using an acknowledgment (ACK) packet. In the ACK packet, an ECN echo (ECE) field in the packet header may be set to 1, to indicate that the congestion occurs. When the sending device 101 sends the packet to the receiving device 103 by using a plurality of network devices, if a packet received by a current network device has been marked by a previous-hop network device, the marked packet is forwarded to a next-hop network device. Therefore, when receiving the marked packet, the receiving device 103 may learn of that the congestion occurs on a network device on an entire forwarding path. When there are the plurality of network devices between the sending device 101 and the receiving device 103, the receiving device 103 may also return an ACK packet to the sending device 101 by using the plurality of network devices, so as to notify the sending device 101 to reduce a packet sending rate.

The network device 102 may be a device such as a switch or a router. The network device 102 may include a processor, at least one queue, and at least one output port. After receiving the packet from the sending device 101, the processor in the network device 102 enqueues the packet in the queue, and sends, to the receiving device 103 through an output port, the packet that is dequeued from the queue. The processor may be a central processing unit (CPU) or a network processor (NP). The queue may be configured to buffer a packet output by the processor. A packet buffered in the queue complies with a first in first out principle, and the queue may be implemented by special-purpose hardware. Packets that are dequeued from a plurality of queues may be sent to the receiving device 103 through one shared output port, and the plurality of queues share a bandwidth of the output port.

Traffic load of the queue may be an outgoing rate of the queue, or may be a ratio of an outgoing rate of the queue to a preset bandwidth of an output port used by the queue in the network device 102, or the like. The outgoing rate of the queue indicates a rate at which data or a packet is output (also referred to as dequeue) from the queue. Average traffic load of the queue indicates an average value of the traffic load of the queue in a period. The network device 102 may calculate the average traffic load of the queue in the following method. For example, when the traffic load of the queue is the outgoing rate of the queue, the average traffic load of the queue may be a value obtained by dividing a quantity of data or a quantity of packets output from the queue in a period by a time length of the period. For example, when the traffic load of the queue is the ratio of the outgoing rate of the queue to the preset bandwidth of the output port used by the queue, the average traffic load of the queue may be a value obtained by dividing a modulus of a quantity of data or a quantity of packets output from the queue in a period and a preset bandwidth of the output port used by the queue by a time length of the period.

The congestion threshold may be used to measure the quantity of packets buffered in the queue. The quantity of packets buffered in the queue may be the quantity of packets buffered in the queue, or a size of data buffered in the queue. When the quantity of packets buffered in a queue in the device exceeds the congestion threshold, it indicates that there are excessive packets to be dequeued from the queue and the congestion occurs on the queue. The congestion threshold may have a preset initial value, for example, 20000 bytes. For example, the congestion threshold may be an ECN threshold.

The first period may be a previous period of the second period. In other words, the first period and the second period are two consecutive periods, and end time of the first period may be start time of the second period.

The fixed value may also be referred to as a step size, and may be a preset quantity of data, for example, an initial step size 15000 bytes, and a step size 4500 bytes after running for a period of time. The target increase value may be a preset increase amplitude threshold. For example, when the traffic load of the queue is the outgoing rate of the queue, the target increase value may be 2 gigabits per second (Gbps). When the traffic load of the queue is the ratio of the outgoing rate of the queue to the preset bandwidth, the target increase value may be 5%. Likewise, a target decrease value may be defined. The target decrease value may be a preset decrease amplitude threshold. The target decrease value is less than 0. When the traffic load of the queue is the outgoing rate of the queue, for example, the target decrease value is −12 Gbps. Alternatively, when the traffic load of the queue is the ratio of the outgoing rate of the queue to the preset bandwidth, for example, the target decrease value is −30%.

Figure 2:
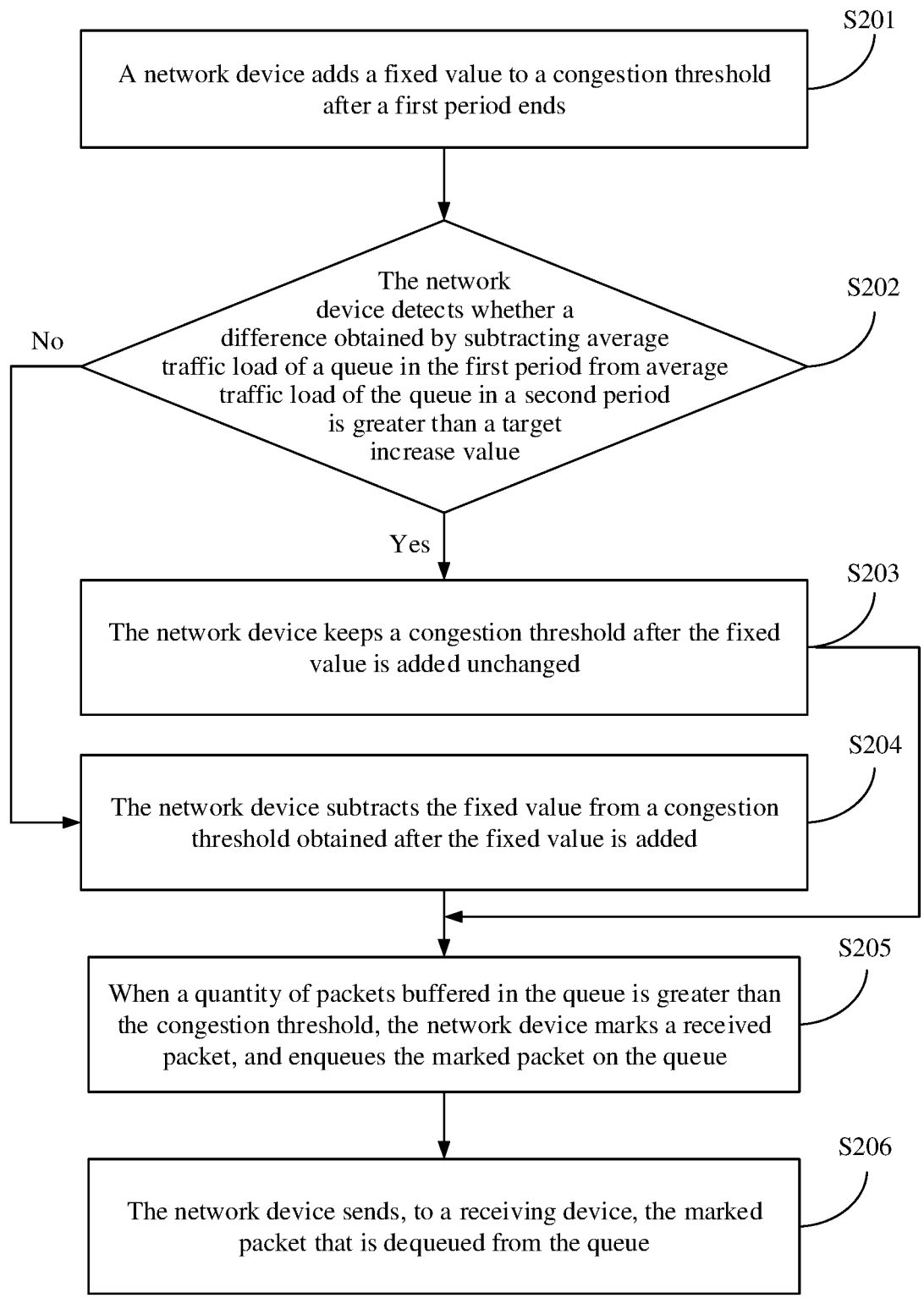
FIG. 2 is a schematic flowchart of a congestion control method according to an embodiment of this application.

Based on the schematic architectural diagram of the congestion control system shown in FIG. 1, refer to FIG. 2. FIG. 2 shows a congestion control method according to an embodiment of this application. The method includes but is not limited to the following steps.

Step S201: A network device adds a fixed value to a congestion threshold after a first period ends.

Figure 3A:
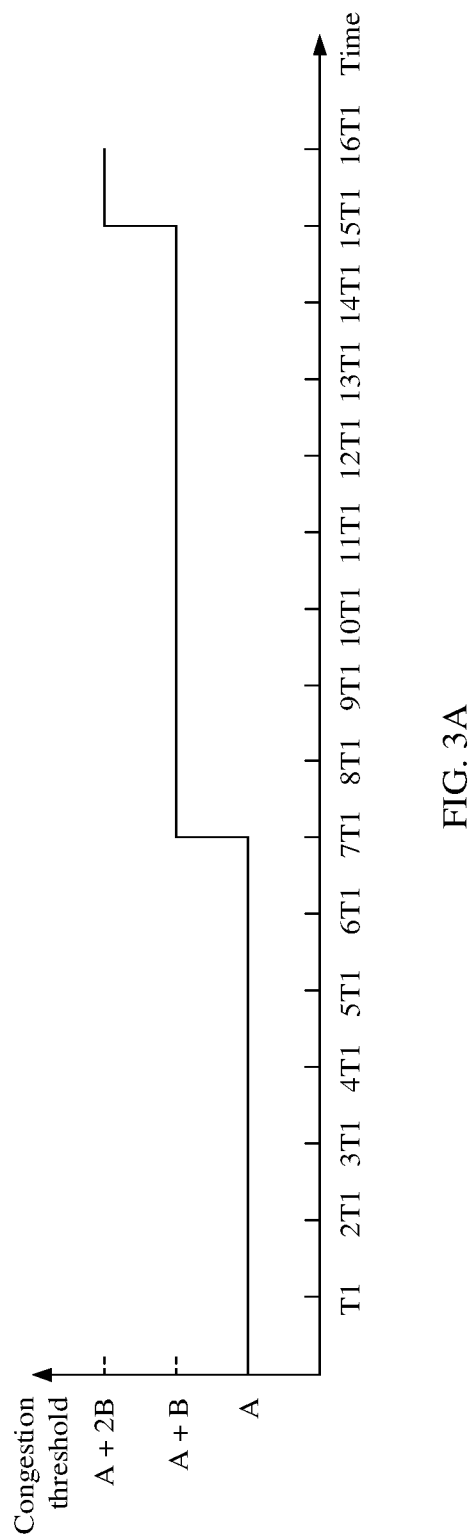
FIG. 3A is a schematic diagram of a congestion threshold according to an embodiment of this application.

For example, the network device may use eight periods as an adjustment cycle. In a first period to a seventh period, the congestion threshold of a queue keeps unchanged. After the seventh period ends, the fixed value is added to the congestion threshold. A congestion threshold obtained after the fixed value is added is used as a congestion threshold of the queue in an eighth period. For example, the seventh period may be the first period described in this embodiment of this application, and the eighth period may be a second period described in this embodiment of this application. A schematic diagram of a congestion threshold shown in FIG. 3A is used as an example. It is assumed that duration of each period is T1, the first period is a time period from 0 to T1, the seventh period is a time period from 6T1 to 7T1, and the eighth period is a time period from 7T1 to 8T1. A congestion threshold of the queue in the first period to the seventh period (namely, a time period from 0 to 7T1) is A, and the fixed value is B. The network device adds the fixed value to the congestion threshold at a moment 7T1. In this way, the network device may determine that the congestion threshold of the queue in the eighth period (namely, the time period from 7T1 to 8T1) may be A+B.

For example, after the seventh period ends, the network device may add the fixed value to the congestion threshold by using the following formula:

$$Th2\_next = Th2\_present + Gap\_slow$$

where Th2_next indicates the congestion threshold of the queue in the eighth period, Th2_present indicates the congestion threshold of the queue in the seventh period, and Gap_slow indicates the fixed value.

Step S202: The network device detects whether a difference obtained by subtracting average traffic load of the queue in the first period from average traffic load of the queue in the network device in the second period is greater than a target increase value.

For example, after adding the fixed value to the congestion threshold after the seventh period ends, the network device may obtain average traffic load of the queue in the eighth period. The network device may obtain a difference obtained by subtracting average traffic load of the queue in the seventh period from the average traffic load of the queue in the eighth period. The difference may be greater than zero or less than zero. The network device detects whether the difference is greater than the target increase value. When the difference is greater than the target increase value, it indicates that service load increases. The network device may keep the congestion threshold obtained after the fixed value is added unchanged, and enter a next adjustment cycle. When the difference is less than or equal to the target increase value and is not less than a target decrease value (in other words, service load increase does not exceed a threshold, and service load decrease does not exceed a threshold), the network device may subtract the fixed value from the congestion threshold obtained after the fixed value is added, namely, roll back to the congestion threshold before added, and enter a next adjustment cycle. The target increase value is greater than 0, and the target decrease value is less than 0.

In a feasible embodiment, when detecting that a difference obtained by subtracting average traffic load of the queue in a previous period of a third period from average traffic load of the queue in the third period is less than the target decrease value, and after the third period ends, the network device multiplies the congestion threshold by a ratio of the average traffic load of the queue in the third period to the average traffic load of the queue in the previous period of the third period.

For example, when average traffic load of the queue decreases sharply in any period of the eight periods included in the adjustment cycle, it indicates that the service load suddenly decreases. After the period ends, the network device may multiply the congestion threshold of the queue in the period by a ratio of the average traffic load of the queue in the period to average traffic load of the queue in a previous period of the period. The target decrease value is less than 0. For example, the network device may obtain a difference obtained by subtracting average traffic load of the queue in a fifth period from average traffic load of the queue in a sixth period. The network device detects whether the difference is less than the target decrease value. When the difference is less than the target decrease value, after the sixth period ends, the network device may multiply the congestion threshold by a ratio of the average traffic load of the queue in the sixth period to the average traffic load of the queue in the fifth period. For example, the any period of the eight periods included in the adjustment cycle may be a third period in this embodiment of this application. For example, when the average traffic load of the queue decreases sharply in the any period in the adjustment cycle, after the period ends, the network device may multiply the congestion threshold of the queue in the period by the ratio of the average traffic load of the queue in the period to the average traffic load of the queue in the previous period of the period, to obtain a congestion threshold of the queue in a next period of the period, and use the next period of the period as a first period in the next adjustment cycle of the adjustment cycle. When the average traffic load of the queue in the second period sharply decreases, the network device detects that the difference obtained by subtracting the average traffic load of the queue in the first period from the average traffic load of the queue in the network device in the second period is not greater than the target increase value and is less than the target decrease value. After the second period ends, the network device multiplies the congestion threshold obtained after the fixed value is added by a ratio of the average traffic load of the queue in the second period to the average traffic load of the queue in the first period.

Figure 3B:
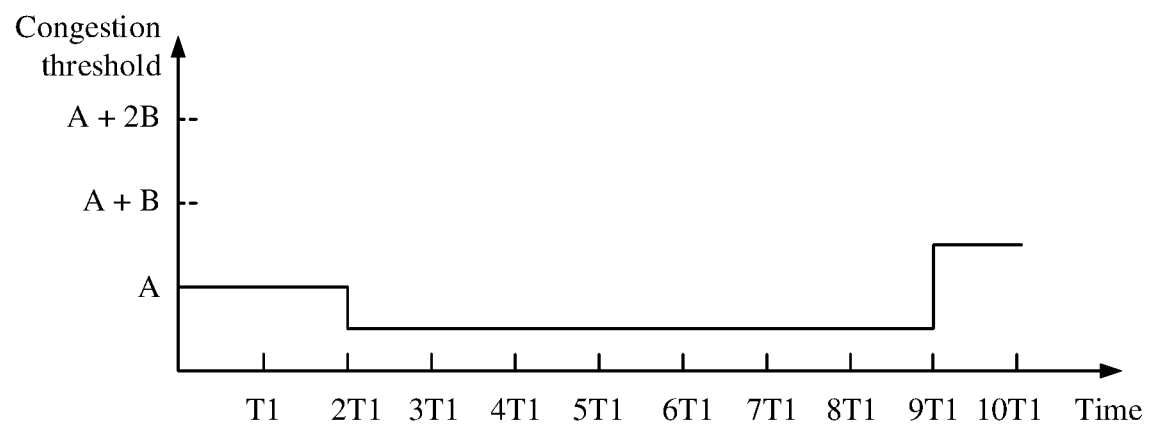
FIG. 3B is a schematic diagram of a congestion threshold according to another embodiment of this application.

A schematic diagram of a congestion threshold shown in FIG. 3B is used as an example. When a difference obtained by subtracting average traffic load of the queue in a time period from 0 to T1 from average traffic load of the queue in a time period from T1 to 2T1 is less than the target decrease value, after the second period ends (namely, at a moment 2T1), the network device may multiply the congestion threshold (namely, A) of the queue in the second period by a ratio of the average traffic load of the queue in the second period to the average traffic load of the queue in the first period. The network device multiplies the congestion threshold of the queue in the time period from T1 to 2T1 by the ratio of the average traffic load of the queue in the time period from T1 to 2T1 to the average traffic load of the queue in the time period from 0 to T1. The product is used as a congestion threshold of the queue in a period from 2T1 to 9T1. Then, the network device may add the fixed value to the congestion threshold of the queue in a time period from 8T1 to 9T1 at a moment 9T1, to obtain a congestion threshold of the queue in a time period from 9T1 to 10T1.

For example, the network device may multiply the congestion threshold by the ratio of the average traffic load of the queue in the third period to the average traffic load of the queue in the previous period of the third period by using the following formula:

$$Th2\_next' = Th2\_present' * Load\_present' / Load\_farmer'$$

where Th2_next' indicates a congestion threshold of the queue in a next period of the third period, Th2_present' indicates a congestion threshold of the queue in the third period, Load_present' indicates the average traffic load of the queue in the third period, and Load_farmer' indicates the average traffic load of the queue in the previous period of the third period.

Step S203: When the difference obtained by subtracting the average traffic load of the queue in the first period from the average traffic load of the queue in the second period is greater than the target increase value, the network device keeps the congestion threshold obtained after the fixed value is added unchanged.

For example, when the difference obtained by subtracting the average traffic load of the queue in the seventh period from the average traffic load of the queue in the eighth period is greater than the target increase value, it indicates that the service load increases. The network device may keep the congestion threshold obtained after the fixed value is added unchanged, and enter the next adjustment cycle. This can improve a throughput of the queue, and improve bandwidth utilization. FIG. 3A is used as an example. When a difference obtained by subtracting average traffic load of the queue in a time period from 6T1 to 7T1 from average traffic load of the queue in a time period from 7T1 to 8T1 is greater than the target increase value, the network device may keep, in a time period from 8T1 to 15T1, the congestion threshold obtained after the fixed value is added unchanged. In other words, the congestion threshold of the queue in the time period from 8T1 to 15T1 is A+B. The network device may also add the fixed value to the congestion threshold of the queue in the time period from 8T1 to 15T1 at a moment 15T1. In other words, a congestion threshold of the queue in a time period from 15T1 to 16T1 is A+2B. Then, the network device may detect whether a difference obtained by subtracting average traffic load of the queue in a time period from 14T1 to 15T1 from average traffic load of the queue in the time period from 15T1 to 16T1 is greater than the target increase value. When the difference obtained by subtracting the average traffic load of the queue in the time period from 14T1 to 15T1 from the average traffic load of the queue in the time period from 15T1 to 16T1 is greater than the target increase value, the network device may keep the congestion threshold of the queue in the time period from 15T1 to 16T1 unchanged. When the difference obtained by subtracting the average traffic load of the queue in the time period from 14T1 to 15T1 from the average traffic load of the queue in the time period from 15T1 to 16T1 is not greater than the target increase value and is not less than the target decrease value, the network device may subtract the fixed value from the congestion threshold of the queue in the time period from 15T1 to 16T1.

Step S204: When the difference obtained by subtracting the average traffic load of the queue in the first period from the average traffic load of the queue in the second period is not greater than the target increase value and is not less than the target decrease value, the network device subtracts the fixed value from the congestion threshold obtained after the fixed value is added.

For example, when the difference obtained by subtracting the average traffic load of the queue in the seventh period from the average traffic load of the queue in the eighth period is not greater than the target increase value and is not less than the target decrease value, it indicates that the congestion threshold before the fixed value is added is close to an appropriate value (after the fixed value is added to the congestion threshold, the service load does not become large enough, and the service load does not suddenly decrease). The network device may subtract the fixed value from the congestion threshold obtained after the fixed value is added, and enter the next adjustment cycle. This reduces a buffer pressure of the queue. FIG. 3C is used as an example. When a difference obtained by subtracting average traffic load of the queue in a time period from 6T1 to 7T1 from average traffic load of the queue in a time period from 7T1 to 8T1 is not greater than the target increase value and is not less than the target decrease value, the network device may subtract, in a time moment 8T1, the fixed value from the congestion threshold obtained after the fixed value is added. In other words, a congestion threshold of the queue in a time period from 8T1 to 15T1 is A. The network device may also add the fixed value to the congestion threshold of the queue in the time period from 8T1 to 1.5T1 at a moment 15T1. In other words, a congestion threshold of the queue in a time period from 15T1 to 16T1 is A+B. Then, the network device may detect whether a difference obtained by subtracting average traffic load of the queue in a time period from 14T1 to 15T1 from average traffic load of the queue in the time period from 15T1 to 16T1 is greater than the target increase value. When the difference obtained by subtracting the average traffic load of the queue in the time period from 14T1 to 1.5T1 from the average traffic load of the queue in the time period from 15T1 to 16T1 is greater than the target increase value, the network device may keep the congestion threshold of the queue in the time period from 15T1 to 16T1 unchanged. When the difference obtained by subtracting the average traffic load of the queue in the time period from 14T1 to 15T1 from the average traffic load of the queue in the time period from 15T1 to 16T1 is not greater than the target increase value and is not less than the target decrease value, the network device may subtract the fixed value from the congestion threshold of the queue in the time period from 15T1 to 16T1.

Step S205: When a quantity of packets buffered in the queue is greater than the congestion threshold, the network device marks a received packet, and enqueues the marked packet in the queue.

Step S206: The network device sends, to a receiving device, the marked packet that is dequeued from the queue.

FIG. 1 is used as an example. The network device 102 dequeues a packet buffered in the queue. When the queue includes the marked packet and an unmarked packet prior to the marked packet, the unmarked packet is first dequeued and sent to the receiving device 103, and then the marked packet is dequeued. The network device 102 sends the marked packet to the receiving device 103.

In the method described in FIG. 2, the network device adds the fixed value to the congestion threshold after the first period ends, and detects whether the difference obtained by subtracting the average traffic load of the queue in the first period from the average traffic load of the queue in the second period is greater than the target increase value. When a detection result is yes, the congestion threshold obtained after the fixed value is added keeps unchanged. When a detection result is no and the difference is not less than the target decrease value, the fixed value is subtracted from the congestion threshold obtained after the fixed value is added. When the quantity of packets buffered in the queue is greater than the congestion threshold, the network device marks the received packet, and enqueues the marked packet in the queue. The network device sends, to the receiving device, the marked packet that is dequeued from the queue. The network device may dynamically adjust the congestion threshold based on a change in the traffic load of the queue. This improves the throughput of the queue and congestion control efficiency when there are a comparatively small quantity of packets buffered in the queue.

Figure 4:
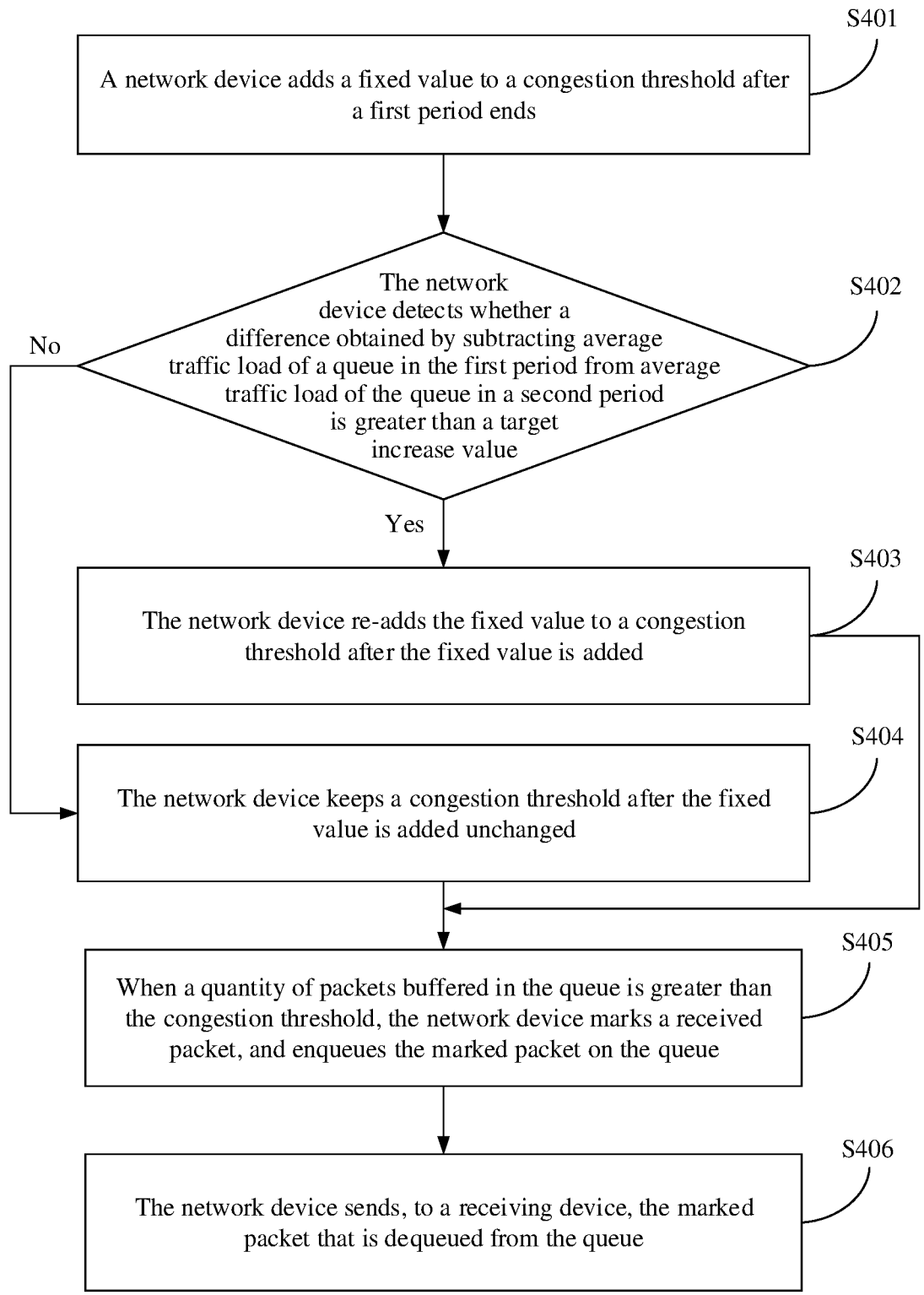
FIG. 4 is a schematic flowchart of a congestion control method according to another embodiment of this application.

Refer to FIG. 4. FIG. 4 shows a congestion control method according to another embodiment of this application. The method includes but is not limited to the following steps.

Step S401: A network device adds a fixed value to a congestion threshold after a first period ends.

Figure 5A:
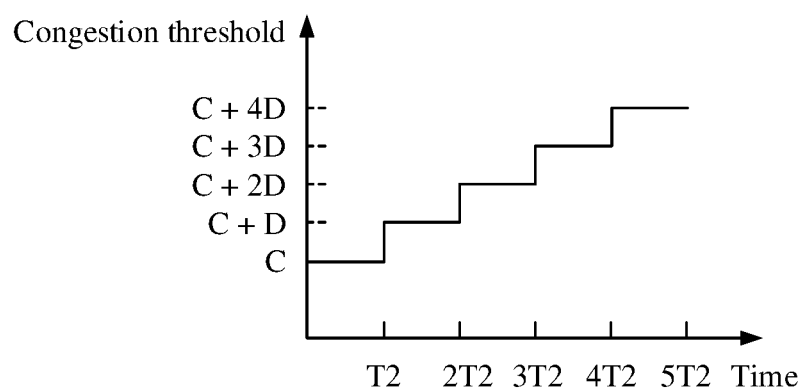
FIG. 5A is a schematic diagram of a congestion threshold according to another embodiment of this application.

For example, in each adjustment period, the network device may add the fixed value to the congestion threshold of the queue in the adjustment period. For example, a previous adjustment period of two adjacent adjustment periods may correspond to the first period in this embodiment of this application, and a next adjustment period of the two adjacent adjustment periods may correspond to a second period in this embodiment of this application. A schematic diagram of a congestion threshold shown in FIG. 5A is used as an example. It is assumed that the first period is a time period from 0 to T2, a congestion threshold of the queue in the first period is C, and the fixed value is D. The network device may add the fixed value to the congestion threshold of the queue in the time period from 0 to T2 at a moment T2. In other words, a congestion threshold of the queue in a time period from T2 to 2T2 is C+D.

In a feasible embodiment, after the network device is started, the network device may use a preset initial value as the congestion threshold of the queue in the first period, and add the fixed value to the congestion threshold after the first period ends. The schematic diagram of the congestion threshold shown in FIG. 5A is used as the example, the first period may be the time period from 0 to T2, the initial value is C, and the fixed value is D. The congestion threshold of the queue in the time period from 0 to T2 is C, and the congestion threshold of the queue in the time period from T2 to 2T2 is C+D.

It should be noted that the fixed value, a target increase value, a target decrease value, the first period, or the second period in this embodiment of this application may be correspondingly the same as or different from the fixed value, the target increase value, the target decrease value, the first period, or the second period in the embodiment shown in FIG. 2. This is not specifically limited in this embodiment of this application.

For example, after the first period ends, the network device may add the fixed value to the congestion threshold by using the following formula:

Th2_next=Th2_present+Gap_fast where Th2_next indicates a congestion threshold of the queue in the second period, Th2_present indicates the congestion threshold of the queue in the first period, and Gap_fast indicates the fixed value.

Step S402: The network device detects whether a difference obtained by subtracting average traffic load of the queue in the first period from average traffic load of the queue in the second period is greater than the target increase value.

For example, the network device may separately collect statistics on average traffic load of the queue in the two adjacent adjustment periods. If an increase amplitude of the average traffic load of the queue in the two adjacent adjustment periods exceeds the target increase value, the network device may continue to increase the congestion threshold based on the fixed value in a next adjustment period. In other words, the network device re-adds the fixed value to a congestion threshold obtained after the fixed value is added. Otherwise, the network device may keep the congestion threshold obtained after the fixed value is added unchanged. The target increase value is greater than 0.

Step S403: When the difference obtained by subtracting the average traffic load of the queue in the first period from the average traffic load of the queue in the second period is greater than the target increase value, the network device re-adds the fixed value to the congestion threshold obtained after the fixed value is added.

FIG. 5A is used as an example. After adding the fixed value to the congestion threshold at the moment T2, the network device may obtain a difference obtained by subtracting average traffic load of the queue in the time period from 0 to T2 from average traffic load of the queue in the time period from T2 to 2T2. When the difference is greater than the target increase value, the network device may re-add the fixed value to the congestion threshold of the queue in the time period from T2 to 2T2 at a moment 2T2. In other words, a congestion threshold of the queue in a time period from 2T2 to 3T2 is C+2D. The network device may also obtain a difference obtained by subtracting the average traffic load of the queue in the time period from T2 to 2T2 from average traffic load of the queue in the time period from 2T2 to 3T2. When the difference is greater than the target increase value, the network device may re-add the fixed value to the congestion threshold of the queue in the time period from 2T2 to 3T2 at a moment 3T2. In other words, a congestion threshold of the queue in a time period from 3T2 to 4T2 is C+3D.

Step S404: When the difference obtained by subtracting the average traffic load of the queue in the first period from the average traffic load of the queue in the second period is not greater than the target increase value, the network device keeps the congestion threshold obtained after the fixed value is added unchanged.

Figure 5B:
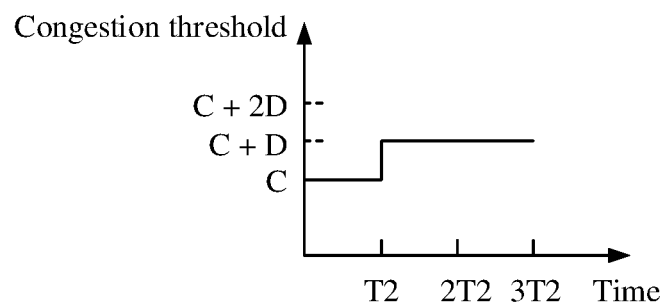
FIG. 5B is a schematic diagram of a congestion threshold according to another embodiment of this application.

A schematic diagram of a congestion threshold shown in FIG. 5B is used as an example. After adding the fixed value to the congestion threshold at the moment T2, the network device may obtain a difference obtained by subtracting average traffic load of the queue in the time period from 0 to T2 from average traffic load of the queue in the time period from T2 to 2T2. When the difference is not greater than the target increase value, the network device may keep a congestion threshold in a time period from T2 to 2T2 unchanged. In other words, the congestion threshold of the queue in the time period from 2T2 to 3T2 is C+D.

Step S405: When a quantity of packets buffered in the queue is greater than the congestion threshold, the network device marks a received packet, and enqueues the marked packet in the queue.

Step S406: The network device sends, to a receiving device, the marked packet that is dequeued from the queue.

Step S406 is similar to the step S206. Details are not described herein again.

In the method described in FIG. 4, the network device adds the fixed value to the congestion threshold after the first period ends. When the difference obtained by subtracting the average traffic load of the queue in the first period from the average traffic load of the queue in the second period is greater than the target increase value, the network device re-adds the fixed value to the congestion threshold obtained after the fixed value is added. When the difference obtained by subtracting the average traffic load of the queue in the first period from the average traffic load of the queue in the second period is less than or equal to the target increase value, the network device keeps the congestion threshold obtained after the fixed value is added unchanged. When the quantity of packets buffered in the queue is greater than the congestion threshold, the network device marks the received packet, and enqueues the marked packet in the queue. The network device sends, to the receiving device, the marked packet that is dequeued from the queue, so that the congestion threshold is adjusted to a minimum value that meets a traffic load requirement. This ensures a throughput of the queue, reduces packet burst, reduces a packet loss rate of the queue, and reduces a buffer pressure of the device.

Figure 6A:
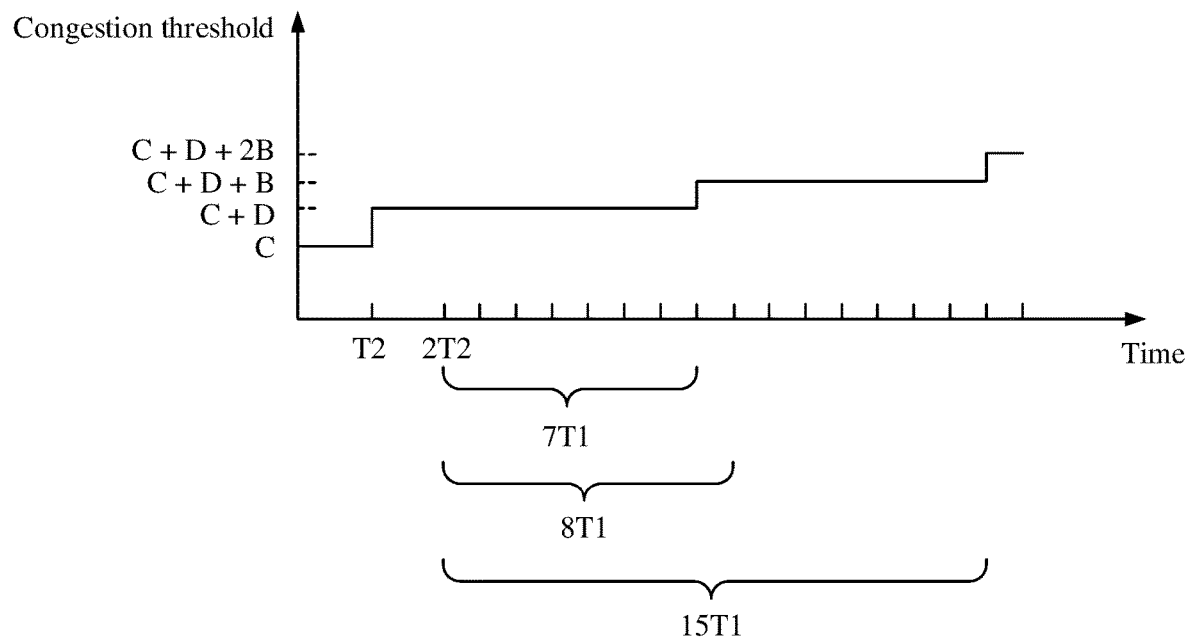
FIG. 6A is a schematic diagram of a congestion threshold according to another embodiment of this application.
Figure 6B:
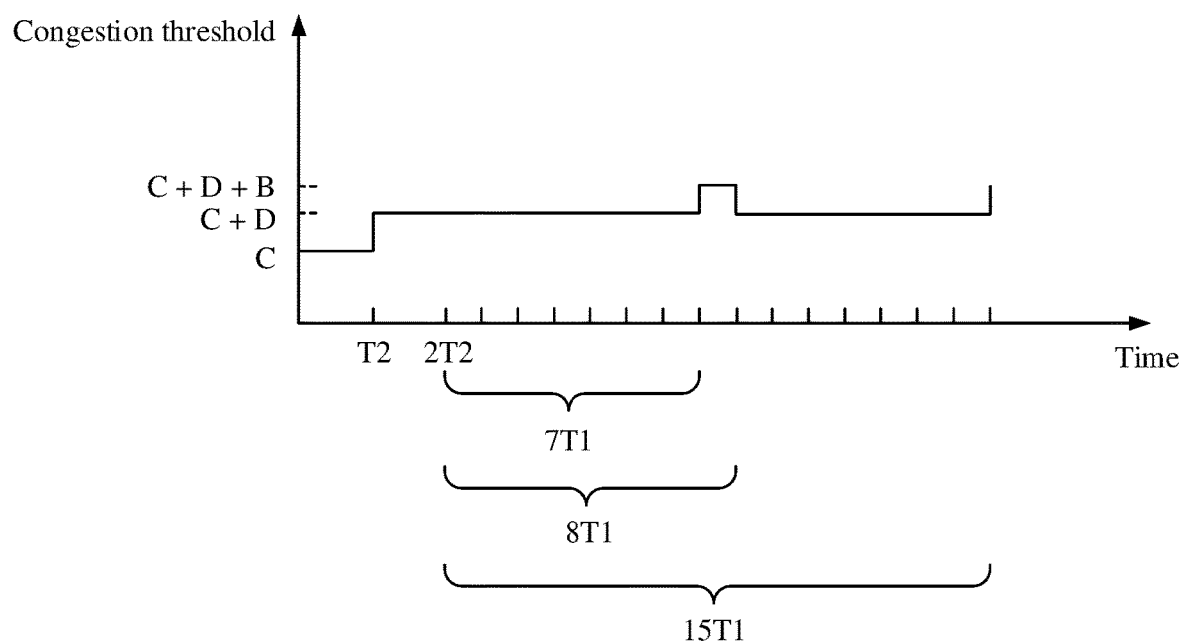
FIG. 6B is a schematic diagram of a congestion threshold according to another embodiment of this application.

FIG. 6A and FIG. 6B are used as an example. A process in which a network device performs congestion control may include a start phase and an adjustment phase. In the start phase, the network device may quickly adjust a congestion threshold to a value adapting to traffic load of a queue. In the adjustment phase, the network device may dynamically adjust, based on a change in the traffic load of the queue, the congestion threshold to a value adapting to traffic load of the queue after the change. The method shown in FIG. 2 may be used in the start phase. The method shown in FIG. 4 may be used in the adjustment phase. The fixed value in the method shown in FIG. 4 may be greater than the fixed value in the method shown in FIG. 2.

The network device is started in the start phase, the network device may use an initial value as a congestion threshold of the queue in a first adjustment period in the start phase. As shown in FIG. 6A, it is assumed that an initial value is C, and a first fixed value in the start phase is D. The network device may use C as a congestion threshold of the queue in a time period from 0 to T2. The network device adds the first fixed value to the congestion threshold at a moment T2, and a congestion threshold of the queue in a time period from T2 to 2T2 is C+D. The network device may separately collect statistics on the average traffic load of the queue in two adjacent adjustment periods. If an increase amplitude of the average traffic load of the queue in the two adjacent adjustment periods exceeds a first target increase value in the start phase, the network device may continue to increase the congestion threshold based on the first fixed value in a next adjustment period. In other words, the network device re-adds the first fixed value to a congestion threshold obtained after the first fixed value is added. Otherwise, the network device may enter the adjustment phase. Duration of any adjustment period is T2.

In the adjustment phase, the network device may use eight periods as an adjustment cycle. In a first period to a seventh period, a congestion threshold of the queue keeps unchanged. After the seventh period ends, a second fixed value is added to the congestion threshold in the adjustment phase. A congestion threshold obtained after the second fixed value is added is used as a congestion threshold of the queue in an eighth period. As shown in FIG. 6A, it is assumed that the second fixed value is B. If a difference obtained by subtracting the congestion threshold of the queue in the time period from 0 to T2 from the congestion threshold of the queue in the time period from T2 to 2T2 is not greater than the first target increase value in the start phase, the network device may enter the adjustment phase. In other words, in a time period from 2T2 to 2T2+7T1, a congestion threshold (namely, C+D) obtained after the first fixed value is added keeps unchanged. Then, the network device adds the second fixed value to a congestion threshold of the queue in a time period from 2T2+6T1 to 2T2+7T1 at a moment 2T2+7T1. In other words, a congestion threshold of the queue in a time period from 2T2+7T1 to 2T2+8T1 is C+D+B. Duration of any period in the adjustment cycle is T1.

Further, when average traffic load of the queue in the eighth period is greater than average traffic load of the queue in the seventh period, the network device may obtain a difference obtained by subtracting the average traffic load of the queue in the seventh period from the average traffic load of the queue in the eighth period. The network device detects whether the difference is greater than a second target increase value. When the difference is greater than the second target increase value, it indicates that service load increases. The network device may keep the congestion threshold after the second fixed value is added unchanged, and enter the next adjustment cycle. When the difference is less than or equal to the second target increase value and is not less than the target decrease value, the network device may subtract the second fixed value from the congestion threshold obtained after the second fixed value is added, namely, roll back to the congestion threshold before added, and enter the next adjustment cycle. As shown in FIG. 6A, the congestion threshold of the queue in the network device in the time period from 2T2 to 2T2+7T1 is C+D. The congestion threshold of the queue in the time period from 2T2+7T1 to 2T2+8T1 is C+D+B. If a difference obtained by subtracting average traffic load of the queue in the time period from 2T2 to 2T2+7T1 from average traffic load of the queue in the time period from 2T2+7T1 to 2T2+8T1 is greater than the second target increase value, the network device may keep, in a time period from 2T2+8T1 to 2T2+15T1, the congestion threshold obtained after the second fixed value is added unchanged. In other words, a congestion threshold of the queue in the time period from 2T2+8T1 to 2T2+15T1 is C+D+B. As shown in FIG. 6B, if the difference obtained by subtracting the average traffic load of the queue in the time period from 2T2 to 2T2+7T1 from the average traffic load of the queue in the time period from 2T2+7T1 to 2T2+8T1 is not greater than the second target increase value and is not less than the target decrease value, the network device may subtract the second fixed value from the congestion threshold obtained after the second fixed value is added at a moment 2T2+8T1. In other words, a congestion threshold of the queue in a time period from 2T2+8T1 to 2T2+15T1 is C+D.

In a feasible embodiment, when average traffic load of the queue decreases sharply in any period of the eight periods included in the adjustment cycle, it indicates that the service load suddenly decreases. After the period ends, the network device may multiply the congestion threshold of the queue in the period by a ratio of the average traffic load of the queue in the period to average traffic load of the queue in a previous period of the period.

Further, after setting the congestion threshold in the foregoing manner, the network device may detect whether a quantity of packets buffered in the queue is greater than the congestion threshold. When the quantity of packets buffered in the queue is greater than the congestion threshold, the network device may mark a received packet, enqueue the marked packet in the queue, and send, to a receiving device, the marked packet that is dequeued from the queue, to implement the congestion control.

Figure 7:
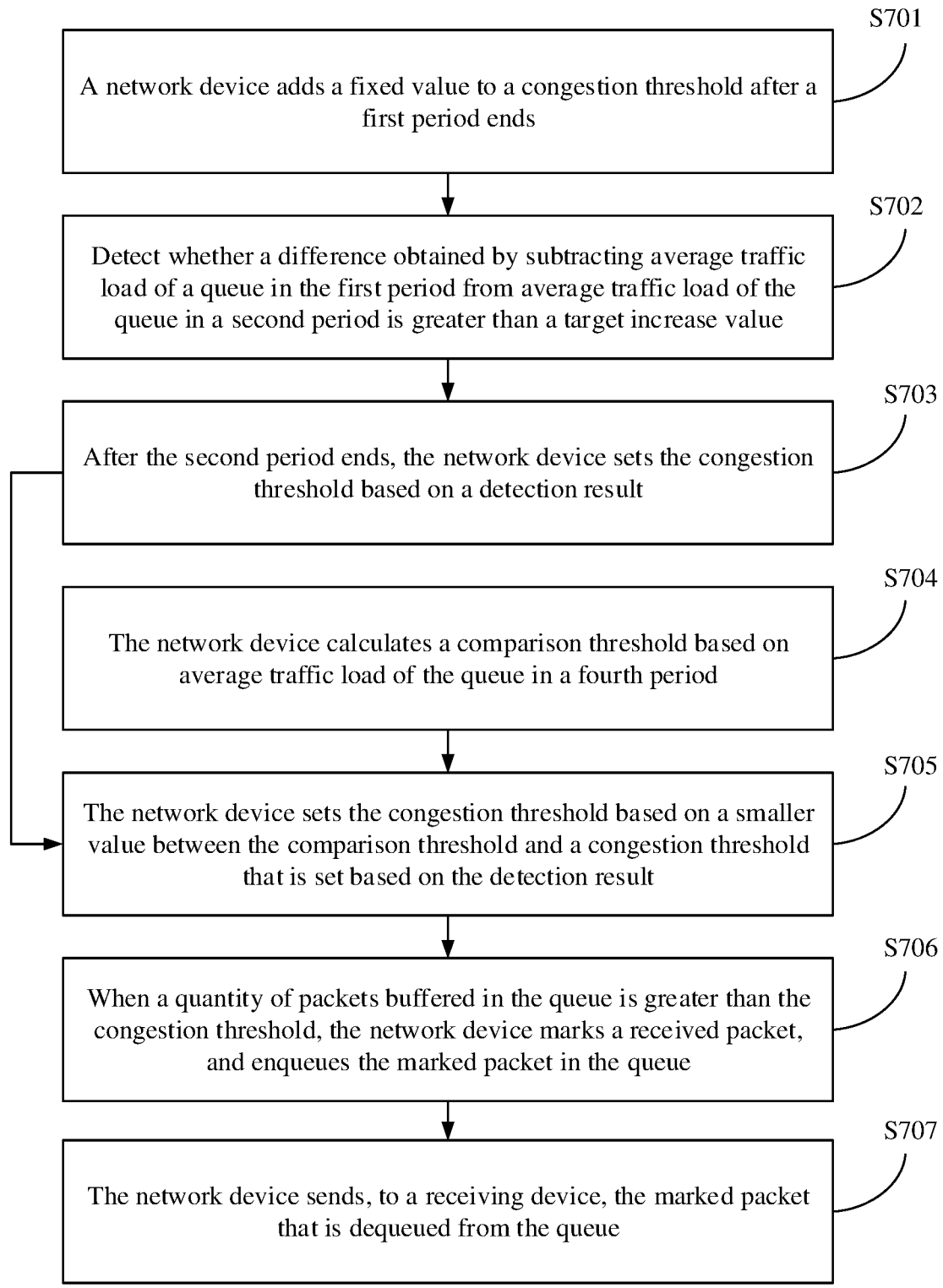
FIG. 7 is a schematic flowchart of a congestion control method according to another embodiment of this application.

Refer to FIG. 7. FIG. 7 shows a congestion control method according to another embodiment of this application. The method includes but is not limited to the following steps.

Step S701: A network device adds a fixed value to a congestion threshold after a first period ends.

Step S702: The network device detects whether a difference obtained by subtracting average traffic load of a queue in the first period from average traffic load of the queue in a second period is greater than a target increase value.

Step S703: After the second period ends, the network device sets the congestion threshold based on a detection result.

It should be noted that, for a method for setting the congestion threshold based on the detection result in this embodiment of this application, refer to the description in the embodiments shown in FIG. 2, FIG. 4, or FIG. 6. This is not limited in this embodiment of this application.

Step S704: The network device calculates a comparison threshold based on average traffic load of the queue in a fourth period.

In a feasible embodiment, the fourth period is a subdivided period included in the second period, and may be a period shorter than a period of the second period. For example, the fourth period has a same end time as the second period, and a length of the fourth period is 10% of a length of the second period. The network device may multiply the average traffic load of the queue in the fourth period by a predetermined value, to obtain the comparison threshold. The comparison threshold reflects real-time average traffic load. For example, the network device may obtain the comparison threshold by using the following formula:

$$Th1 = CQ\_out * Target\_Delay$$

where Th1 indicates the comparison threshold obtained through calculation after the fourth period ends, CQ_out indicates the average traffic load of the queue in the fourth period, and Target_Delay indicates the predetermined value.

It should be noted that, the predetermined value is, for example, a target latency. The predetermined value may be a size specified by a user, and is a configurable value. If a requirement is that a data amount buffered in the queue is small and a latency is small, the predetermined value may be as close as possible to a round-trip time (RTT) latency during no-load. If the requirement is improving bandwidth utilization and avoiding under-throughput, the preset value may be greater than the RTT latency. The RTT latency indicates a total latency from time when a sending device sends data to time when the sending device receives an acknowledgment from a receiving device (the receiving device sends the acknowledgment immediately after receiving a packet).

Step S705: The network device sets the congestion threshold based on a smaller value between the comparison threshold and the congestion threshold that is set based on the detection result.

The network device may compare the comparison threshold with the congestion threshold that is set based on the detection result, and use a smallest threshold between the comparison threshold and the congestion threshold that is set based on the detection result as a congestion threshold of the queue in a next period of the second period.

Step S706: When a quantity of packets buffered in the queue is greater than the congestion threshold, the network device marks a received packet, and enqueues the marked packet in the queue.

Step S707: The network device sends, to a receiving device, the marked packet that is dequeued from the queue.

In the method described in FIG. 7, the network device adds the fixed value to the congestion threshold after the first period ends, detects whether the difference obtained by subtracting the average traffic load of the queue in the first period from the average traffic load of the queue in the second period is greater than the target increase value, and after the second period ends, sets the congestion threshold based on the detection result. The network device may further calculate the comparison threshold based on the average traffic load of the queue in the fourth period, and use the smallest threshold between the comparison threshold and the congestion threshold that is set based on the detection result as the congestion threshold. When the quantity of packets buffered in the queue is greater than the congestion threshold, the network device may mark the received packet, and enqueue the marked packet in the queue. The network device sends, to the receiving device, the marked packet that is dequeued from the queue. In the method shown in FIG. 7, setting the congestion threshold based on the detection result may be gradually adjusting the congestion threshold based on changes of average traffic load in plurality of periods. Setting the congestion threshold based on the comparison threshold may reflect average traffic load in a smaller period. The congestion threshold set based on the detection result can improve a throughput of the queue and congestion control efficiency when there are a comparatively small quantity of packets buffered in the queue. In addition, with the calculation and the comparison of the comparison threshold, when the comparison threshold is smaller, the congestion threshold that set based on the comparison threshold can reflect real-time control. When average traffic load suddenly increases, a threshold is increased to avoid under-throughput. When the average traffic load decreases, the threshold is decreased, to notify a source end to reduce a rate as soon as possible, to avoid excessive queue stacking. When the second period ends, if the average traffic load in the fourth period decreases greatly, and the comparison threshold is less than the congestion threshold calculated in the embodiments shown in FIG. 2, FIG. 4, or FIG. 6, the congestion threshold may be set closer to real-time traffic load based on the comparison threshold, to notify the source end to reduce the rate as soon as possible, to avoid the excessive queue stacking.

The foregoing describes in detail the method in the embodiments of this application. The following provides apparatuses in the embodiments of this application.

Figure 8:
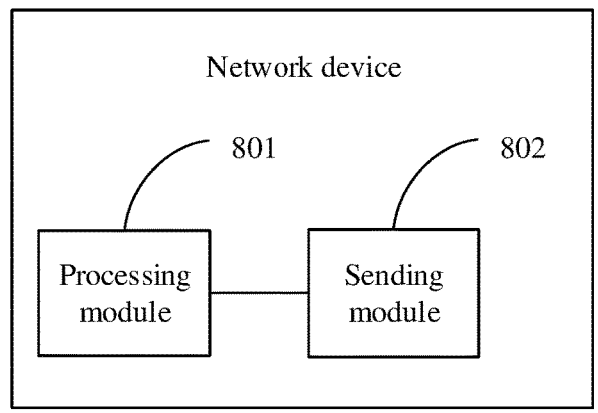
FIG. 8 is a schematic diagram of a structure of a network device according to an embodiment of this application.

Refer to FIG. 8. FIG. 8 is a schematic diagram of a structure of a network device according to an embodiment of this application. The network device is configured to implement functions of network devices in the embodiments in FIG. 2, FIG. 4, FIG. 6, and FIG. 7. A function block of the network device may implement solutions of this application by hardware, software, or a combination of hardware and software. A person skilled in the art should understand that the function block described in FIG. 8 may be combined or separated into several sub-blocks to implement the solutions of this application. Therefore, the content described above in this application may support any possible combination, separation, or further definition of the following function blocks.

As shown in FIG. 8, the network device may include a processing module 801 and a sending module 802. Detailed descriptions of the modules are as follows.

The processing module 801 is configured to add a fixed value to a congestion threshold after a first period ends, detect whether a difference obtained by subtracting average traffic load of a queue in the first period from average traffic load of the queue in the network device in a second period is greater than a target increase value, and set the congestion threshold based on a detection result after the second period ends. The first period is a period previous to the second period.

The processing module 801 is further configured to mark a received packet when a quantity of packets buffered in the queue is greater than the congestion threshold, and enqueue the marked packet in the queue. The mark indicates that congestion occurs on the network device.

The sending module 802 is configured to send, to a receiving device, the marked packet that is dequeued from the queue.

Optionally, that the processing module 801 sets the congestion threshold includes: when the detection result is yes, keeping a congestion threshold obtained after the fixed value is added unchanged.

Optionally, that the processing module 801 sets the congestion threshold includes: when the detection result is no and the difference is not less than a target decrease value, subtracting the fixed value from the congestion threshold obtained after the fixed value is added.

Optionally, that the processing module 801 sets the congestion threshold includes: when the detection result is no and the difference is less than the target decrease value, multiplying the congestion threshold obtained after the fixed value is added by a ratio of the average traffic load of the queue in the second period to the average traffic load of the queue in the first period.

Optionally, the processing module 801 is further configured to: when detecting that a difference obtained by subtracting average traffic load of the queue in a previous period of a third period from average traffic load of the queue in the third period is less than the target decrease value, and after the third period ends, multiply the congestion threshold by a ratio of the average traffic load of the queue in the third period to the average traffic load of the queue in the previous period of the third period.

Optionally, that the processing module 801 sets the congestion threshold includes: when the detection result is yes, re-adding the fixed value to a congestion threshold obtained after the fixed value is added.

Optionally, that the processing module 801 sets the congestion threshold includes: calculating a comparison threshold based on average traffic load of the queue in a fourth period, where the second period includes the fourth period; and setting the congestion threshold based on a smaller value between the comparison threshold and a congestion threshold obtained after the fixed value is added.

Optionally, that the processing module 801 calculates the comparison threshold includes: multiplying the average traffic load of the queue in the fourth period by a predetermined value, to obtain the comparison threshold.

Optionally, that the processing module 801 sets the congestion threshold includes: calculating a comparison threshold based on the average traffic load of the queue in the second period; and setting the congestion threshold based on a smaller value between the comparison threshold and a congestion threshold obtained after the fixed value is added.

Optionally, that the processing module 801 calculates the comparison threshold includes: multiplying the average traffic load of the queue in the second period by a predetermined value, to obtain the comparison threshold.

[ono] It should be noted that, for implementation of the modules, refer to corresponding descriptions in the embodiments shown in FIG. 2, FIG. 4, FIG. 6, and FIG. 7.

Optionally, the network device shown in FIG. 8 may further include a receiving module, configured to receive a packet from a sending device, and send the received packet to the processing module.

It should be noted that, in the embodiments of this application, division into the modules is an example, and is merely a logical function division. In an actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

Figure 9:
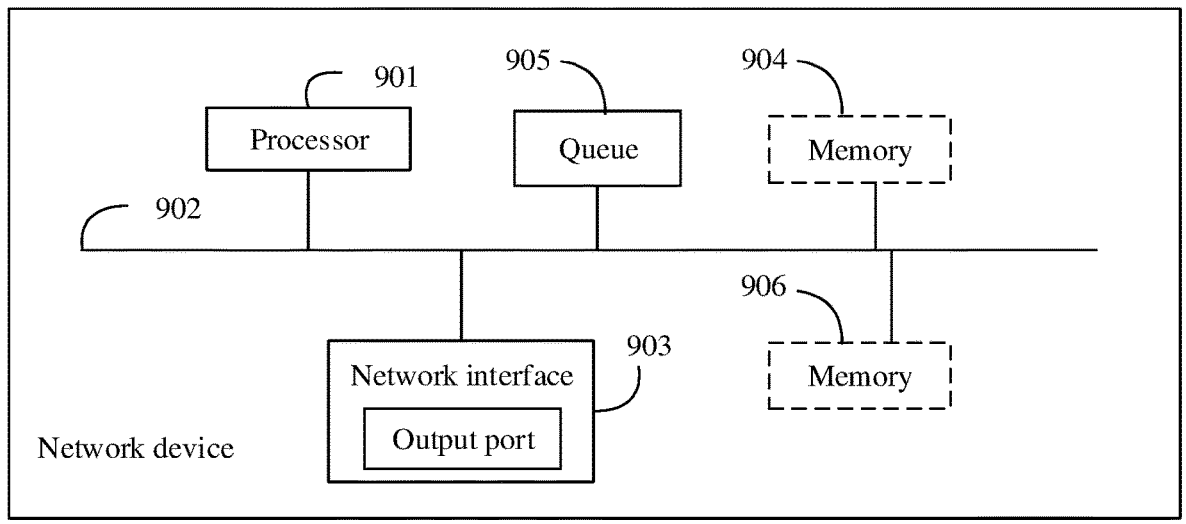
FIG. 9 is a schematic diagram of a structure of a network device according to another embodiment of this application.

Refer to FIG. 9. FIG. 9 is a schematic diagram of a structure of a network device according to an embodiment of this application. As shown in FIG. 9, the network device may include at least one processor 901, a bus 902, and a network interface 903. Optionally, the network device may further include a memory 904. The network device may further include a queue 905. The queue 905 may be implemented by hardware or implemented by hardware in combination with software. The network interface 903, the memory 904, and the processor 901 may be connected to each other through the bus 902. The bus 902 may be a peripheral component interconnect (PCI) bus, an extended industry standard architecture (EISA) bus, or the like. The bus may be classified into an address bus, a data bus, a control bus, and the like. For ease of representation, only one thick line in FIG. 9 is used for representation, but this does not mean that there is only one bus or only one type of bus.

The processor 901 may be a CPU, an NP, a general purpose processor, a digital signal processor (DSP), an application-specific integrated circuit (ASIC), a field programmable gate array (FPGA), another programmable logic component, a transistor logic device, a hardware component, or any combination thereof. When the processor 901 is one CPU, the CPU may be a single-core CPU, or may be a multi-core CPU.

The network interface 903 may include an output port, configured to send a marked packet to a receiving device. The network interface 903 may further include an input port, configured to receive a packet from a sending device. The network device may further separately send and receive packets through different network interfaces 903.

The memory 904 may be specifically configured to store a congestion threshold, and the like. The memory 904 is, for example, a register. Optionally, the memory 904 may be included in the processor 901. The queue 905 may be configured to buffer a packet that is sent by the processor and that is to be sent from the output port.

The network device may further include a memory 906 configured to store a computer program instruction. The processor 901 may execute the computer program instruction in the memory 906, so that the network device performs the methods performed by the network devices shown in FIG. 2, FIG. 4, FIG. 6, and FIG. 7. In this case, the processor 901 may be the CPU or the NP. The memory 906 may include a volatile memory, such as a random access memory (RAM), the memory may include a non-volatile memory, such as a read-only memory (ROM), a flash memory, a hard disk drive (HDD), or a solid-state drive (SSD), or the memory may include a combination of the foregoing types of memories.

When the processor 901 is the NP or a combination of an NP and an FPGA, the processor 901 may directly execute an instruction stored in the processor 901, so that the network device performs the method performed by the network devices shown in FIG. 2, FIG. 4, FIG. 6, and FIG. 7, or when the processor 901 is the NP or a combination of an NP and an FPGA, an operation is directly performed by using an internal hardware circuit (for example, an FPGA circuit), so that the network device performs the methods performed by the network devices in FIG. 2, FIG. 4, FIG. 6, and FIG. 7. The processor 901 may implement a function of the processing module in FIG. 8. The network interface 903 may implement a function of the sending module in FIG. 8. Components of the network device may perform the following operations:

The processor 901 is configured to add a fixed value to a congestion threshold after a first period ends, detect whether a difference obtained by subtracting average traffic load of a queue in the first period from average traffic load of the queue in the network device in a second period is greater than a target increase value, and set the congestion threshold based on a detection result after the second period ends. The first period is a period previous to the second period.

The processor 901 is further configured to mark a received packet when a quantity of packets buffered in the queue is greater than the congestion threshold, and enqueue the marked packet in the queue. The mark indicates that congestion occurs on the network device.

The network interface 903 is configured to send to the receiving device, the marked packet that is dequeued from the queue.

Optionally, that the processor 901 sets the congestion threshold is specifically configured to: when the detection result is yes, keep a congestion threshold obtained after the fixed value is added unchanged.

Optionally, that the processor 901 sets the congestion threshold is specifically configured to: when the detection result is no and the difference is not less than a target decrease value, subtract the fixed value from the congestion threshold obtained after the fixed value is added.

Optionally, that the processor 901 sets the congestion threshold is specifically configured to: when the detection result is no and the difference is less than the target decrease value, multiply the congestion threshold obtained after the fixed value is added by a ratio of the average traffic load of the queue in the second period to the average traffic load of the queue in the first period.

Optionally, the processor 901 is further configured to: when detecting that a difference obtained by subtracting average traffic load of the queue in a previous period of a third period from average traffic load of the queue in the third period is less than the target decrease value, and after the third period ends, multiply the congestion threshold by a ratio of the average traffic load of the queue in the third period to the average traffic load of the queue in the previous period of the third period.

Optionally, that the processor 901 sets the congestion threshold is specifically configured to: when the detection result is yes, re-add the fixed value to a congestion threshold obtained after the fixed value is added.

Optionally, that the processor 901 sets the congestion threshold is specifically configured to: calculate a comparison threshold based on average traffic load of the queue in a fourth period, where the second period includes the fourth period; and set the congestion threshold based on a smaller value between the comparison threshold and a congestion threshold obtained after the fixed value is added.

Optionally, that the processor 901 calculates the comparison threshold is specifically configured to: multiply the average traffic load of the queue in the fourth period by a predetermined value, to obtain the comparison threshold.

Optionally, that the processor 901 sets the congestion threshold is specifically configured to: calculate a comparison threshold based on the average traffic load of the queue in the second period; and set the congestion threshold based on a smaller value between the comparison threshold and a congestion threshold obtained after the fixed value is added.

Optionally, that the processor 901 calculates the comparison threshold is specifically configured to: multiply the average traffic load of the queue in the second period by a predetermined value, to obtain the comparison threshold.

It should be understood that the network device is merely an example provided in the embodiments of this application. In addition, the network device may have more or fewer components than shown components, may combine two or more components, or may have different component configurations.

Specifically, the network device described in this embodiment of this application may be configured to implement some or all of the processes in the method embodiments described with reference to FIG. 2 to FIG. 7 in this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A method, comprising:
   transmitting, by a network device, traffic in a first period and a second period, wherein the traffic is transmitted based on a first threshold in the first period and based on a second threshold in the second period, the first period is earlier than the second period, and the second threshold is greater than the first threshold;
   obtaining, by the network device, a first average traffic load of a queue in the first period and a second average traffic load of the queue in the second period;
   determining, by the network device, when the second period ends, a third threshold based on a difference and a target increase value, wherein the difference is determined by subtracting the first average traffic load from the second average traffic load, and the target increase value is greater than zero;
   marking, by the network device, a received packet when a quantity of packets buffered in the queue is greater than the third threshold, and queueing the marked packet in the queue, wherein the marked packet indicates that congestion occurs; and
   sending, by the network device to a receiving device, the marked packet when the marked packet is dequeued from the queue.

2. The method according to claim 1, wherein determining the third threshold based on the difference and the target increase value comprises:
   when the difference is greater than the target increase value, determining the third threshold to be equal to the second threshold.

3. The method according to claim 1, wherein determining the third threshold based on the difference and the target increase value comprises:
   when the difference is less than or equal to the target increase value and the difference is greater than or equal to a target decrease value, determining the third threshold to be less than the second threshold.

4. The method according to claim 3, wherein the third threshold is equal to the first threshold.

5. The method according to claim 1, wherein determining the third threshold based on the difference and the target increase value comprises:
   when the difference is less than or equal to the target increase value and the difference is less than the target decrease value, determining the third threshold to be a product of the second threshold and a ratio of the second average traffic load to the first average traffic load.

6. The method according to claim 1, wherein determining the third threshold based on the difference and the target increase value comprises:
when the difference is less than a target decrease value and less than the target increase value, determining the third threshold to be a product of the second threshold and a ratio of the second average traffic load to the first average traffic load.

7. The method according to claim 1, wherein determining the third threshold based on the difference and the target increase value comprises:
when the difference is greater than the target increase value, determining the third threshold to be greater than the second threshold.

8. The method according to claim 7, wherein the network device is a router or a switch.

9. The method according to claim 1, wherein determining the third threshold based on the difference and the target increase value comprises:
calculating a comparison threshold based on a fourth average traffic load of the queue in a fourth period and the target increase value, where the second period comprises the fourth period; and
determining the third threshold based on a smaller value between the comparison threshold and the second threshold.

10. The method according to claim 9, where the comparison threshold is a product of the fourth average traffic load and a predetermined value.

11. A network device, comprising:
a processor; and
a network interface, configured to:
transmit traffic in a first period and a second period, wherein the traffic is transmitted based on a first threshold in the first period and based on a second threshold in the second period, the first period is earlier than the second period, and the second threshold is greater than the first threshold;
wherein the processor is configured to:
obtain a first average traffic load of a queue in the first period and a second average traffic load of the queue in the second period;
determine, when the second period ends, a third threshold based on a difference and a target increase value, wherein the difference is determined by subtracting the first average traffic load from the second average traffic load, and the target increase value is greater than zero; and
mark a received packet when a quantity of packets buffered in the queue is greater than the third threshold, and queue the marked packet in the queue, wherein the marked packet indicates that congestion occurs; and
wherein the network interface is configured to:
send, to a receiving device, the marked packet when the marked packet is dequeued from the queue.

12. The network device according to claim 11, wherein the processor being configured to determine the third threshold based on the difference and the target increase value comprises the processor being configured to:
when the difference is greater than the target increase value, determine the third threshold to be equal to the second threshold.

13. The network device according to claim 11, wherein the processor being configured to determine the third threshold based on the difference and the target increase value comprises the processor being configured to:
when the difference is less than or equal to the target increase value and the difference is greater than or equal to a target decrease value, determine the third threshold to be less than the second threshold.

14. The network device according to claim 13, wherein the third threshold is equal to the first threshold.

15. The network device according to claim 11, wherein the processor being configured to determine the third threshold based on the difference and the target increase value comprises the processor being configured to:
when the difference is less than or equal to the target increase value and the difference is less than the target decrease value, determine the third threshold to be a product of the second threshold and a ratio of the second average traffic load to the first average traffic load.

16. The network device according to claim 11, wherein the processor being configured to determine the third threshold based on the difference and the target increase value comprises the processor being configured to:
when the difference is less than a target decrease value and less than the target increase value, determine the third threshold to be a product of the second threshold and a ratio of the second average traffic load to the first average traffic load.

17. The network device according to claim 11, wherein the processor being configured to determine the third threshold based on the difference and the target increase value comprises the processor being configured to:
when the difference is greater than the target increase value, determine the third threshold to be greater than the second threshold.

18. The network device according to claim 17, wherein the network device is a router or a switch.

19. The network device according to claim 11, wherein the processor being configured to determine the third threshold based on the difference and the target increase value comprises the processor being configured to:
calculate a comparison threshold based on a fourth average traffic load of the queue in a fourth period and the target increase value, where the second period comprises the fourth period; and
determine the third threshold based on a smaller value between the comparison threshold and the second threshold.

20. The network device according to claim 19, wherein the comparison threshold is a product of the fourth average traffic load and a predetermined value.

* * * * *